Patented May 30, 1950

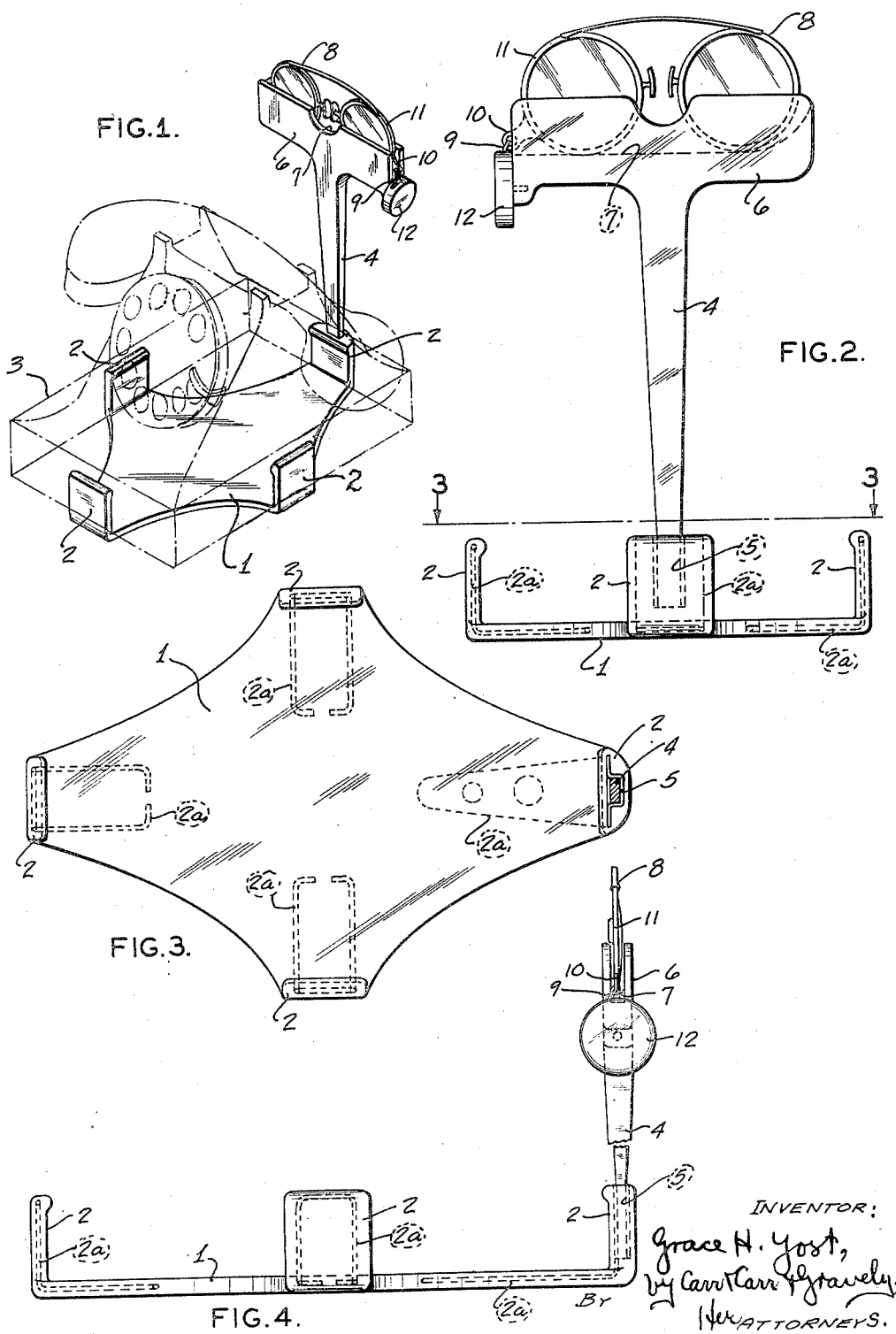

2,509,793

UNITED STATES PATENT OFFICE 2,509,793

SPECTACLE HOLDER ATTACHMENT FOR TELEPHONES

Grace H. Yost, St. Louis, Mo.

Application October 27, 1945, Serial No. 624,993

5 Claims. (Cl. 248—300)

This invention relates to telephone attachments. It has for its principal object to devise a telephone attachment for holding spectacles or eyeglasses for use in aiding the vision of a person at the telephone. Another object is to provide for supporting the spectacles when not in use and to provide a confining chain for said spectacles and a spring reel for said chain. Other objects are to provide for simplicity and cheapness of construction of the attachment and for readily securing it to the telephone. The invention consists in the spectacle holder telephone attachment and in the parts and combinations and arrangements of parts hereinafter described and claimed.

In the accompanying drawing, which forms part of this specification and wherein like symbols refer to like parts wherever they occur, Fig. 1 is a perspective view showing my spectacle holder attachment secured to a French or cradle-type telephone, Fig. 2 is a front elevational view of said attachment, Fig. 3 is a horizontal cross sectional view on the line 3—3 in Fig. 2; and Fig. 4 is a side elevational view of said attachment.

My spectacle holder telephone attachment comprises a flat base 1 of rubber or other suitable material having upstanding laterally resilient spring arms 2 at the sides thereof. The base of a French or other type telephone 3 seats on the base 1 of the attachment and the spring arms 2 bear resiliently against the side of the telephone base and thus clamp the base of the attachment thereto. The resiliency and strength of the upstanding arms 2 of the base 1 of the attachment may be increased by means of spring steel reinforcing wires or plates 2a imbedded in said base and said arms.

The attachment is provided at the rear edge thereof with an upright support or standard 4 which is permanently fixed at its lower end in a socket 5 provided therefor in the top of the rearmost clamping arm of the base 1 of the attachment and terminates at its upper end in a horizontal crosshead or bar 6 having a longitudinal groove 7 in its upper edge. This groove extends substantially from end to end of the crosshead 6 of the post or standard 4 and is adapted to receive and support a pair of removable spectacles or eyeglasses 8 having lenses of rather high magnifying powers so that they may be used by anyone regardless of the type of lens prescribed for his own use.

The spectacles 8 are anchored to the telephone attachment so that they may be removed from the supporting groove 7 provided therefor in the crosshead 6 of the spectacle stand 4 but may not be accidentally or intentionally carried away. The spectacle anchoring or confining means preferably comprises a chain, cord or other flexible member 9 that is permanently secured to an outstanding lug or finger piece 10 at one end of the spectacle frame 11. The other end of the chain 9 is fixed in a spring reel 12 of any desired type which is permanently secured in a desired manner to one end of the crosshead 6 of the spectacle stand 4 just below the bottom of the spectacle supporting groove 7 therein, whereby the spectacles 8 may be removed from said groove and the anchor chain unwound from said reel far enough to permit use of said spectacles. After the telephone user has finished with the spectacles 8 they are replaced in the groove 7 in the crosshead 6 of the post 4 and the chain 9 is retracted or wound up in the spring reel 12. As shown in the drawing, the spectacle supporting groove 7 is open at the end of the crosshead 6 to which the spring reel 12 is secured so as to accommodate the adjacent chain attaching lug 10 of the spectacle frame 11, while the groove is closed at the other end of said crosshead to aid in properly positioning the spectacles 8 therein.

The hereinbefore described spectacle holder telephone attachment is simple and economical and of a pleasing appearance and may be readily attached to the telephone. The spectacles are mounted back of the telephone and above the level of the top thereof where they are in full view of the user of the telephone and do not interfere with the operation thereof. The spectacles may be quickly and easily removed from the supporting stand therefor for use in aiding the telephone user in locating numbers on the dial of the telephone and in the telephone book and in reading and writing notes or other memoranda. The anchoring chain is of sufficient length to permit convenient use of the spectables and the spring reel serves to automatically take up slack in said chain when the spectacles are replaced on the supporting stand therefor.

Obviously, the hereinbefore described spectacle holder telephone attachment admits of considerable modification without departing from the invention. Therefore, I do not wish to be limited to the precise arrangement shown and described.

What I claim is:

1. A telephone attachment comprising a base portion adapted for attachment to a telephone and a stand portion having a seat for removably supporting a pair of spectacles and a flexible member connected at one end to said stand portion and at the other end to said pair of spectacles for anchoring said pair of spectacles to said attachment.

2. A telephone attachment comprising a base portion adapted for attachment to a telephone and a stand portion having a seat for removably supporting a pair of spectacles, a reel mounted on said attachment and a chain wound upon said reel and permanently connected to said pair of spectacles for anchoring them to said attachment.

3. The combination set forth in claim 2 wherein said seat for said pair of spectacles comprises a groove in the top of said stand portion and said reel is secured to said stand portion adjacent to one end of said groove.

4. The combination set forth in claim 2 wherein said stand portion is located at the rear of said attachment and terminates at its upper end in a crosshead, said seat for said pair of spectacles comprises a groove in the top of said crosshead, and said reel is secured to said crosshead at one end of said groove.

5. The combination set forth in claim 4 wherein said base portion has upstanding spring arms adapted to grip the base of the telephone, and said stand portion rises from one of said upstanding spring arms.

GRACE H. YOST.

REFERENCES CITED

The following references are of record in the file of this patent:

UNITED STATES PATENTS

| Number | Name | Date |
|---|---|---|
| 1,319,774 | Kallajian | Oct. 28, 1919 |
| 1,767,003 | Kaplan et al. | June 24, 1930 |
| 1,868,344 | Blum | July 19, 1932 |
| 1,908,840 | Greist et al. | May 16, 1933 |
| 1,931,286 | Drew | Oct. 17, 1933 |